United States Patent
Chakirov

(10) Patent No.: US 9,053,412 B2
(45) Date of Patent: Jun. 9, 2015

(54) DOCUMENT DELIVERY TO A MOBILE DEVICE USING MOBILE DEVICE BASED PERMISSIONS

(71) Applicant: Research In Motion Limited, Waterloo (CA)

(72) Inventor: Martin Chakirov, Trelleborg (SE)

(73) Assignee: BlackBerry Limited, Waterloo, Ontario (CA)

( * ) Notice: Subject to any disclaimer, the term of this patent is extended or adjusted under 35 U.S.C. 154(b) by 66 days.

(21) Appl. No.: 13/784,440

(22) Filed: Mar. 4, 2013

(65) Prior Publication Data

US 2014/0009783 A1    Jan. 9, 2014

Related U.S. Application Data

(60) Provisional application No. 61/667,825, filed on Jul. 3, 2012.

(51) Int. Cl.
*G06F 3/12* (2006.01)
*G06K 15/00* (2006.01)

(52) U.S. Cl.
CPC .............. *G06K 15/40* (2013.01); *G06F 3/1204* (2013.01); *G06F 3/1206* (2013.01); *G06F 3/1245* (2013.01); *G06F 3/1292* (2013.01); *G06F 2206/1512* (2013.01)

(58) Field of Classification Search
CPC .. G06K 15/1889; G06K 15/40; G06F 3/1285; G06F 3/1292

USPC ................................................. 358/1.13, 1.15
See application file for complete search history.

(56) References Cited

U.S. PATENT DOCUMENTS

| 2004/0196486 A1 | 10/2004 | Uchino |
| 2004/0205453 A1 | 10/2004 | Mortensen |
| 2010/0309510 A1 | 12/2010 | Hansen |
| 2012/0300242 A1* | 11/2012 | Meike et al. ................. 358/1.13 |
| 2013/0088733 A1* | 4/2013 | Yach et al. ................... 358/1.13 |

FOREIGN PATENT DOCUMENTS

EP    1465051    10/2004

OTHER PUBLICATIONS

European Patent Office, "Extended European Search Report," issued in connection with application No. EP 13157671.2, on Mar. 5, 2014, 7 pages.

* cited by examiner

*Primary Examiner* — Thomas Lett
(74) *Attorney, Agent, or Firm* — Fish & Richardson P.C.

(57) ABSTRACT

Mobile devices enable users to access data and documents in a convenient portable format. The disclosed method and system enables management of permissions associated with documents to be transferred/moved onto a mobile device for review or reference by making the transfer simple and straight forward so that it may be easy for non-technically literate users using a printer driver metaphor on a sending device such as a personal computer.

24 Claims, 12 Drawing Sheets

DOCUMENT DELIVERY TO A MOBILE DEVICE USING MOBILE DEVICE BASED PERMISSIONS

CROSS REFERENCE TO RELATED APPLICATIONS

This application claims priority of provisional application Ser. No. 61/667,825 filed Jul. 3, 2012, the entire disclosure of which is hereby incorporated by references for all purposes.

TECHNICAL FIELD

The present disclosure relates to document transfer to a mobile device and in particular to document delivery to a mobile device using a printer driver using mobile device based permissions.

BACKGROUND

As mobile devices such as e-book readers, tablet computers and smart phones become everyday tools that enable users to access data and documents in a convenient portable form, the integration into traditional document delivery mechanisms may become more imperative. The delivery of documents to a mobile device have been typically limited to downloading via e-mail or from network based document sources or data stores such as a website through hypertext transfer protocol (HTTP) or file transfer protocol (FTP) mechanisms. As mobile devices provide a more acceptable reading and presentation experience and move towards replacing paper based documents, the need for carrying paper documents can be reduced particularly when operating between a desktop office based work environment and a portable or mobile work environment. The presentation of documents on varying mobile device formats provided by differences in screen size and display resolution can present a sub-optimal experience when the document provided has not been generated with constraints of the mobile device in mind. In addition, integration of mobile devices into the networked office environment has been limited by lack of integration with existing document delivery infrastructure. In addition the transfer of electronic documents to a mobile device has required knowledge of mobile device identifiers and passkeys to initiate a document transfer and do not provide permission based access which can be controlled by the mobile device user.

Therefore there is a need for an improved system and method of document delivery to a mobile device using mobile device based permissions.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
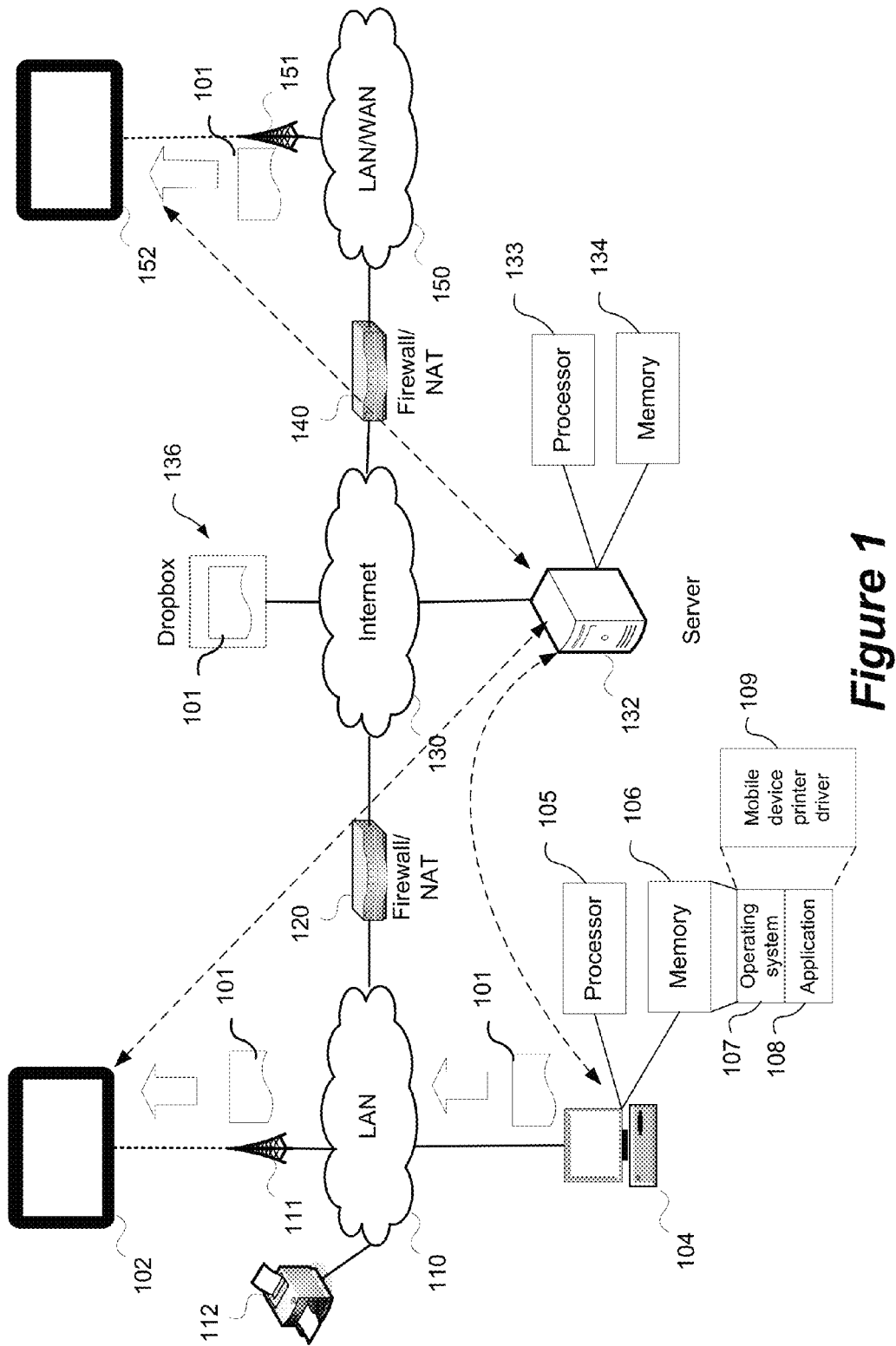
FIG. 1 shows a representation of an example of a system for document printing from a sender device to a mobile device.

In accordance with an aspect there is provided a method of document delivery to a mobile device using mobile device based permissions the method comprising: sending a print permission request from a sending device to a server coupled to a communications network providing a user identifier; receiving confirmation of acceptance of the print permission request at the sending device from the server; and adding the user identifier associated with the mobile device to a printer driver on the sending device, the user identifier associated with the mobile device presented in a print dialog box on the sending device when an electronic document is to be formatted and transferred from the sending device to the mobile device.

In accordance with another aspect there is provided a system comprising: a mobile device for receiving electronic documents, the mobile device operable to associate a permission with a user identifier associated with the sending device; a server for locating the mobile device on a network; a sending device for sending documents to the mobile device, the documents transferred by a printer driver from within a document application on the sending device, the printer driver providing formatting of the document to be received by the mobile device, the client device operable for sending a print permission request to the server providing a user identifier associated with the mobile device and a user identifier of the sending device; and the server locating the mobile device associated with the user identifier of the mobile device and providing the print permission request to the mobile device, the mobile device associating a permission with the user identifier of the sending device and providing confirmation to the sending device of acceptance of the print permission request, the sending device adding a user identifier to the printer driver for subsequent sending of documents to the mobile device from the sending device.

In accordance with yet another aspect there is provided a non-transitory computer readable memory containing instructions for document delivery to a mobile device using mobile device based permissions, the instruction which when executed by a processor of a sending device performing: sending a print permission request from a sending device to a server coupled to a communications network providing a user identifier associated with the mobile device and a user identifier associated with the sending device; receiving confirmation of acceptance of the print permission request at the sending device from the server; and adding the user identifier associated with the mobile device to a printer driver on the sending device, the user identifier associated with the mobile device presented in a print dialog box on the sending device when an electronic document is to be formatted and transferred by the printer driver from the sending device to the mobile device.

In accordance with still yet another aspect there is provided a method of electronic document transfer permission management, the method comprising: receiving at a sending device an invitation to associate a print permission to a user identifier associated with a mobile device; providing confirmation of acceptance of the invitation from the sending device to a server coupled to a network; and assigning a user identifier provided in the invitation in a printer driver at the sending device, the user identifier presented in a print dialog box on the sending device when an electronic document is to be formatted and transferred from the sending device to a mobile device associated with the user identifier.

Embodiments are described below, by way of example only, with reference to FIGS. 1-12. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Mobile devices enable a user to access data and documents in a convenient portable format. The disclosed system and method enables documents to be transferred/moved onto a mobile device for review or reference by, for example, making the transfer simple and straight forward so that it may be easy for non-technically literate users (e.g. administrative assistant putting documents on their executive's mobile device). From a sender's perspective the transfer mechanism can work whether the mobile device is on a local network (relative to the sender) or on a remote network when the sender does not know the actual location of the mobile device. The user of the mobile device can assign permissions to the sender regarding how and when documents can be transferred to the mobile device. In addition the user of the mobile device can invite a sender to enable document printing and a sender device can request the permission to send documents via the printer driver to the mobile device.

FIG. 1 shows a representation of a system for document printing to a mobile device. To transfer documents from a sending device 104, the mobile device 102/152 is presented using a printer metaphor accessible within an operating system and applications of the sending device 104, such as document creation applications such as word processing, presentation, spreadsheet, photo editing, drawing, or communication applications such as e-mail. The mobile device 102/152 is represented as a printer on a sender device 104 and the user 'prints' electronic documents 101 to the mobile device 102/152. The mobile device 102 may be connected to a wireless interface 111 to a local area network (LAN) 110 or may be connected to a remote LAN having wireless capability or wide area network (WAN) 150 such as a wireless service provider network through a wireless interface 151. The sender device 104 may be a personal computer or computing device that supports printer functionality comprising at least a processor 105 and memory 106 for executing instructions to provide applications that enable a user to direct documents to a printer. The memory 106 can store an operating system 107 and applications 108 which can access a mobile device printer driver 109 that can be installed on the sender device 104 and configured to 'point' to one or more mobile devices 102/152 or associated user accounts. The mobile device printer driver 109 on the sender device 104 is configured with identification information associated with one or more mobile devices 102/152 or user identifiers and may also include security or credential information. Similar to using a network printer 112, the user is not exposed to the details of connecting to the printer once it is configured. Documents can therefore be transferred from the sender device 104 using the mobile device printer driver 109, enabling document transfer to be conveniently transferred using the known printer driver metaphor.

By using the printer metaphor to transfer documents, the sender may be able to control both the content and the presentation of the electronic document 101 transferred to the mobile device 102/152 as compared to a file transfer mechanism (e.g. FTP) that would only allow the sender to control the content (i.e. picking the file to be transferred). The use of a mobile device printer driver 109 on the sender device 104 may allow the sender to influence presentation aspects such as, for example, page format, margins, orientation, page range, and other similar presentation aspects based upon constraints of the mobile device 102/152. The electronic document 101 may be transferred to the mobile device 102/152 in one of one or more pre-established file formats (e.g. PDF or PS). The sender does not need to be concerned with the presence of an application that supports a particular file format (e.g. .DOC, .XLS, .PPT, .PS, .PDF) on the mobile device 102/152.

Each mobile device 102/152 that is configured to receive electronic documents 101 via the printer driver 109 mechanism may expose one or more share directories in its file system that may each be a target for electronic document 101 delivery. Various forms of privileges, permissions and access control can be enabled to provide security for the share directory. Each mobile device 102/152 may be able to support multiple share directories each potentially having different privilege and access control setting (e.g. a corporate share directory and a personal share directory on the same mobile device 102/152) that can be associated with credentials or privileges associated with the sender device 104 or a user of the sender device 104. In some implementations, the mobile device 102/152 may also receive print permission requests from a user of the sending device 104 to enable transfer of electronic documents 101. The requests may be provided, for example, through the printer driver 109 or initiated through alternate communication applications such as an instant/voice/video messaging, e-mail message, text messaging, social networking or a dedicated messaging protocol on the sender device 104. The print permission request may be accepted or denied by a user of the mobile device 102/152 and may also define additional permission for, for example, the number of transfers that may be permissible. In addition, in some implementations, the mobile device 102/152 may initiate an invitation to a sending device 104, for example, by providing identification of the mobile device 102/152 and identification of mobile device printer driver 109 required to facilitate printing of documents to the mobile device 102/152. In some implementations, the acceptance or invitation may include parameters associated with aspects of the mobile device 102/152 which may be used by the mobile device printer driver 109 of the sending device 102/152 to format the electronic document when sending the electronic document to the mobile device 102/152. The printer driver 109 may be installed as part of the operating system of the sending device and provided as a resource to which documents can be sent to.

From time-to-time in response to changes in the mobile device 102/152 network context, for example when connecting to a new network 150 by a wireless interface 151, the mobile device 102/152 may register with a server 132 by providing it's current network address, such as an Internet Protocol (IP) address. In some implementations, the mobile device 102/152 may also provide the names of its one or more share directories and device interface identifiers (IDs), such as a media access control (MAC) address associated with the network address. Alternatively, this information may be preconfigured or stored at the server 132. If the mobile device 102/152 has access through multiple interfaces, the registration may include identification of multiple network addresses and device interface IDs.

The server 132 may be located so that it is accessible by any mobile device 102/152 that has connectivity to the Internet 130 or any widely available wired or wireless connection medium. The server 132 may maintain mobile device configuration information such as, for example, user ID, network address ID, device interface ID, share directories, access privileges/permissions, dropbox locations associated with one or more mobile devices 102/152. The mobile device may be associated with a user account identifier such as, for example, a user name or e-mail address. In some implementations, an account or user identifier may be associated with multiple mobile devices enabling a document to be directed to one or more of the mobile devices. For example, one account may have multiple mobile devices such as, for example, a tablet device and a smartphone, associated with it, where a print request may send a document to both devices, or, for example, only to an active or accessible device. The server 132 may be a distributed service executed by one or more computers or servers having processors 133 and associated memory 134 for executing instructions. The server 132 may also process invitation requests from the sender device 104 to the mobile device 102/152 and vice versa.

When the mobile device printer driver on the sender device 104 wants to transfer an electronic document 101 to the mobile device 102/152, the sender device 104 may send a print request to the server 132. The request may contain, for example, a device identifier or a user identifier. The user may select user ID or devices that have already been associated with the printer driver, or may initiate a request to allowing access to the mobile device 102/152, via the printer driver. In some implementations, in response to the print request, the server 132 may provide one or more network address identifiers and/or device interface identifiers of the target mobile device 102/152 and may also provide a share directory identifier if one is not already pre-selected. Alternatively, the server 132 may request connection information from the mobile device 102/152 which may in turn be provided to the sender device 104. A transfer mechanism incorporated in, or associated with, the mobile device printer driver may then use, for example, the mobile device IP address to establish a connection with the mobile device 102/152. In some implementations, the transfer mechanism may use a universal resource locator (URL) identifier associated with the mobile device 102/152. The URL may define a hyperlink transfer protocol (HTTP), HTTP secure (HTTPS) or file transfer protocol (FTP) address which may allow a session to be initiated between the sender device 104 and the mobile device 102/152 using secure socket layer or transport layer security (SSL/TLS). In an HTTP or HTTPS transfer the sender device can utilize HTTP post to transfer the electronic document 101. Depending on the location of the mobile device 102/152 relative to the sender device 104, different connection delivery techniques may be required to transfer the electronic document 101. The sender device 104 can determine if a direct connection can be performed with the mobile device 102 and will initiate a connection to transfer the electronic document 101. If the mobile device 152 has an IP address on another network 150 then any intervening firewalls and/or Network Address Translators (NAT) 120 or 140 may interfere with connectivity and an alternate connection mechanism may be required to successfully deliver the electronic document 101. The mechanisms may include the use of protocols such as, for example, Session Initiation Protocol (SIP)/Session Description Protocol (SDP), Simple Traversal of User Datagram Protocol through Network Address Translators (STUN), Traversal Using Relay NAT (TURN), and Interactive Connectivity Establishment (ICE) provided by the server 132 or one or more other servers. When connection to the mobile device 104/152 is not possible, a network dropbox 136 may be utilized to transfer documents to a location by utilizing, for example, network storage. The mobile device 152 may periodically check the network dropbox 136 for new electronic documents 101 or access the dropbox 136 based upon receipt of a kicker packet from the sender device 102 providing notification of the presence of an electronic document 101.

Figure 2:
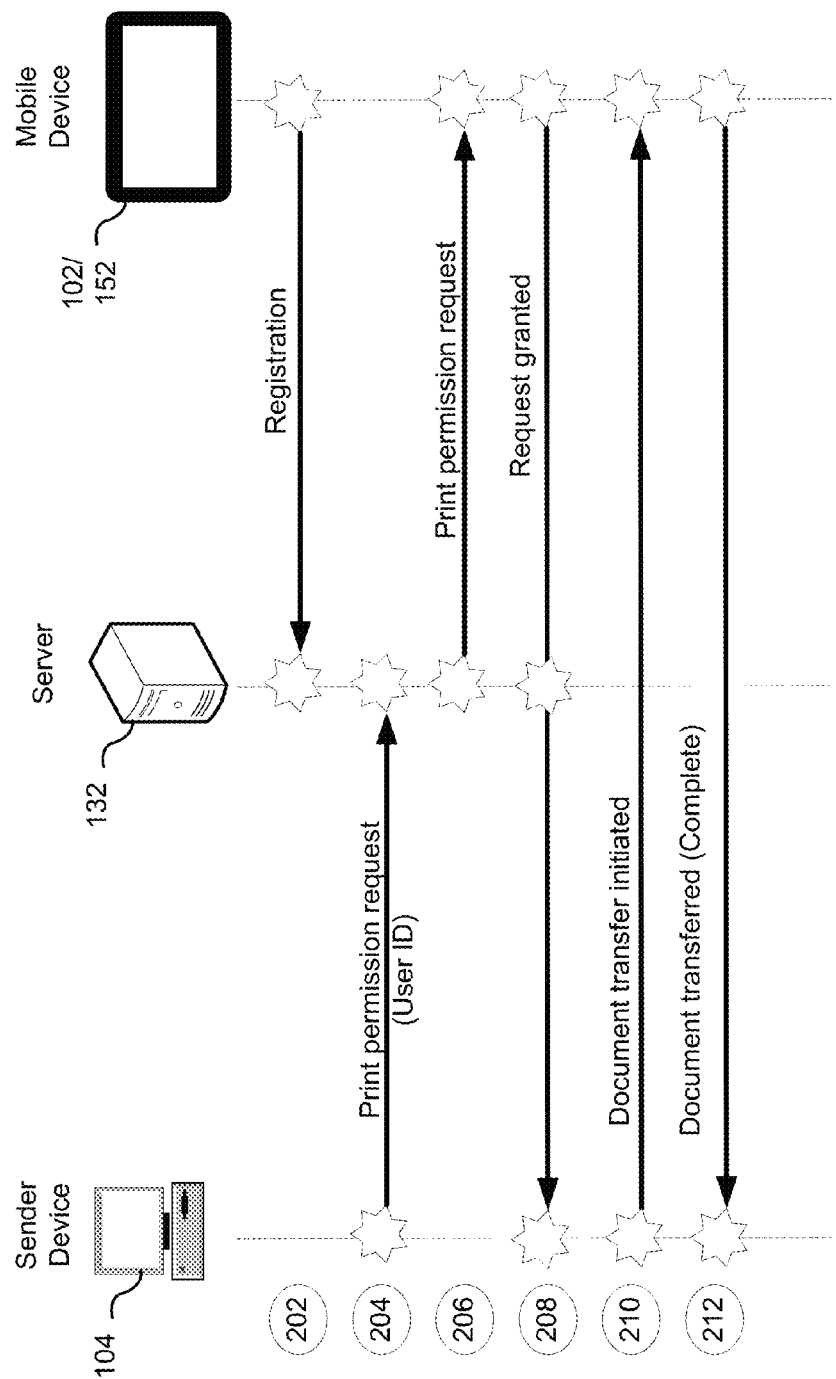
FIG. 2 shows an example of a message flow for granting permissions to a sender device for transferring of electronic documents by a mobile device printer driver.

FIG. 2 shows an example message flow for granting permissions to a sender device 104. When the mobile device 102/152 changes network context, for example by registering on a new network, such as through a dynamic host configuration protocol (DHCP) registration where the device 152 receives a new network address, a registration message (202) may be sent to the server 132 coupled to a network 130 accessible by the mobile device 102/152. Alternatively, the mobile device 152 may recognize that a networking device interface is activated, that may have a fixed or a previously assigned network address, to trigger sending of the registration message. The registration message may comprise at least a device identifier and a network address and may also include a device interface identifier such as a MAC address, and/or include a target directory for receiving the electronic documents 101 on the mobile device 102/152. When the mobile device 102/152 has multiple network interfaces active, the registration may include identification of multiple network addresses and network interface identifiers.

At the sending device 104, such as a personal computer, when the user selects to print an electronic document 101 to the mobile device 102/152, or the user ID associated with the mobile device 102/152, the mobile device print driver 109 may send a request (204), referred to herein as a print permission request, to the server 132. The print permission request may identify the mobile device 102/152 by a unique identifier or by the user ID and may be initiated via the print driver 109 or via another communication application such as instant/voice/video messaging, social networking, or e-mail application which would then associate the user ID with the printer driver 109. The print permission request may be in the form, for example, of an instant/voice/video message, text message, e-mail message or HTTP post request. The print permission request may identify a user ID, for example an e-mail address or unique user name identifier. The server 132 may determine the mobile device 102/152 associated with the user ID and forward the print permission request to the mobile device 102/152 (206) this message from the location server 132 may be in a different format. For example, the server 132 may communicate the print permission request to the mobile device 102/152 using session initiation protocol (SIP). When the mobile device 102/152 accepts the print access request the permission may be granted to the sender device 104 (208).

The server 132 may maintain the permission or acceptance state, and enable document relay facilities when the mobile device 102/152 is not directly accessible to receive the printed electronic document 101. The granting of the request may also include a URL or a secure URL to grant access to the mobile device 102/162 that can be used to transfer the electronic document 101. The sender device 104 can then initiate transfers (210) to the mobile device 102/152 using the received URL or may be required to initiate a print access request as described in FIG. 3. Alternatively, the transfer of the information may utilize SIP to facilitate the electronic document transfer. The mobile device 102/152 may also provide security information such as a password, token or certificate to the sender device or the mobile device 102/152 may use the server 132 or other central server as a certificate authority to connect to the mobile device 102/152. The server 132 may forward the URL to the sender device 104. The sender device 104 may use this URL to push the file to the mobile device 102/152 with an HTTP post or an HTTPS post if security is required or other direct peer-to-peer transfer mechanism such as FTP. The electronic document 101 may be formatted to be compatible with the mobile device based upon desired parameters in the print driver, parameters provided in response the print access permission request, or by performing a database lookup to determine the appropriate formatting parameters for the target device. For example the size of the document, resolution, content, or the type of document container, such as .PDF, .PS, .DOC may be modified to match the resources of the mobile device 102/152 and then sent to the mobile device.

The transfer process is complete when the mobile device 102/152 indicates that the transfer is complete (212). If the transfer is unsuccessful the sender device 104 may request alternate connection mechanism from the server 132. In some implementations, the print permission request may also include the electronic document itself, or a reference to the electronic document 101 to be retrieved by the server 132 or mobile device 102/152, which may not be delivered to the device until the print permission request is accepted.

Figure 3:
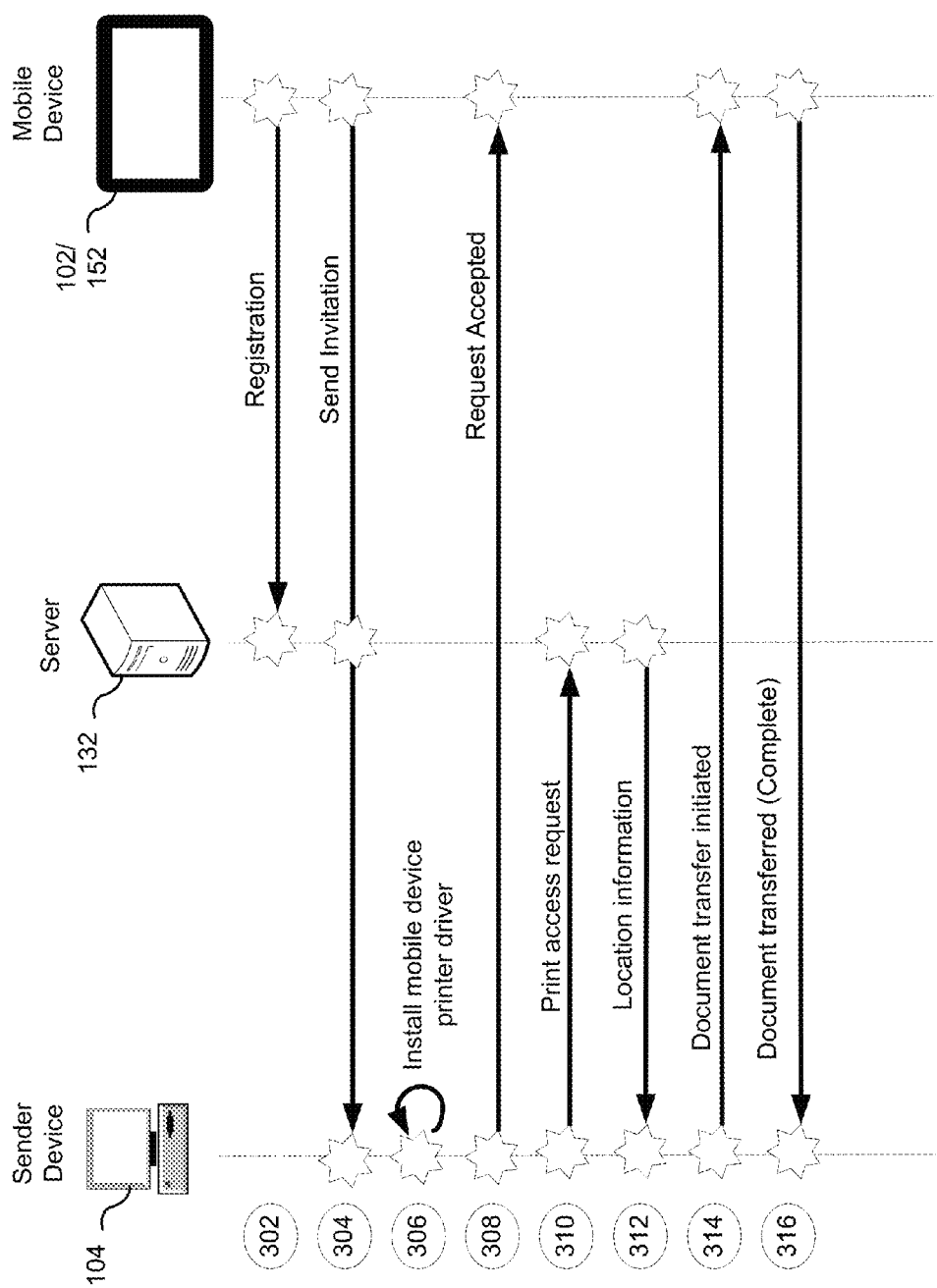
FIG. 3 shows an example of a message flow for initiating an invitation to a sender device for transferring of electronic documents by a mobile device printer driver.

FIG. 3 shows an example message flow for initiating an invitation to a sender device from the mobile device. As with FIG. 2, the mobile device 102/152 may register with server 132 to provide identification of the current network location (302). When the mobile device 102/152 changes network context, for example by registering on a new network, for example through a dynamic host configuration protocol (DHCP) registration where the device 152 receives a new network address from the network, the registration message may be sent to the server 132 coupled to a network 130 that is accessible by the mobile device 102/152. The user of the device 102/152 can initiate an invitation request to a sender device 104 using a user identifier such as, for example, an e-mail address, contact list, instant/voice/video messaging application, social networking application or other communication application that may be able to be associated with a user or device (304). The invitation request may be processed by a server 132 to determine the associated user or sender device 104, or it may be processed through traditional communications protocols, for example e-mail servers for deliver to the sender device 104 via a mail account or other messaging process. The sender device 104 can then process the request, which may occur locally on the sender device 104, for example within an instant/voice/video messaging client, or may direct the sender device 104 to an interface provided by server 132, or an associated server to process the request, such as, for example, a webpage provided by a web-server for acceptance or denial of the request. The sender device 104 may then download and install a printer driver (306) if not already installed to provide electronic document processing and transfer of the electronic document to the mobile device 102/152. Acceptance of the print request may then be provided (208) to the mobile device 102/152. The printer driver is then associated with the mobile device or user ID.

At the sending device 104, such as a personal computer, when the user selects to print an electronic document 101 to the mobile device 102/152 may be prompted to select user or device if more than one is associated in the printer driver, the mobile device print driver 109 sends a print request (310) to the server 132. The print request may identify the mobile device 102/152, for example, by a unique identifier, such as a PIN identifier, or by a user account which in some implementations may be associated with more than one mobile device 102/152. The server 132 may perform a look-up to determine the current location of the mobile device 102/152 and provide location information (312) including, for example, a network address and a device interface identifier, associated with the mobile device 102/152, to the sender device 104. Location information may be provided for more than one device if multiple devices are associated with a user account identifier. The server 132 may also identify one or more directories on the mobile device 102/152. A directory may be determined based, for example, upon the sender device 104 credentials, a document type or selection made by the user upon sending the print request. The device identifier used by the server 132 may be associated with one or more mobile devices 102/152, where server 132 may in turn provide location information 306 for more than one mobile device 102/152. Additionally or alternatively the print request may contain the document which is provided to server with the identifier, either in the request or transferred in a separate process.

The sending device 104 can then initiate a transfer to the mobile device 102/152 (314) by initiating a connection request to the mobile device 102/152. Once the connection is established, the electronic document 101, which may be formatted for the device via the printer driver, can be transferred to the mobile device 102/152 to the designated destination directory. Confirmation can then be provided from the mobile device 102/152 to the sender device 104 (316).

Figure 4:
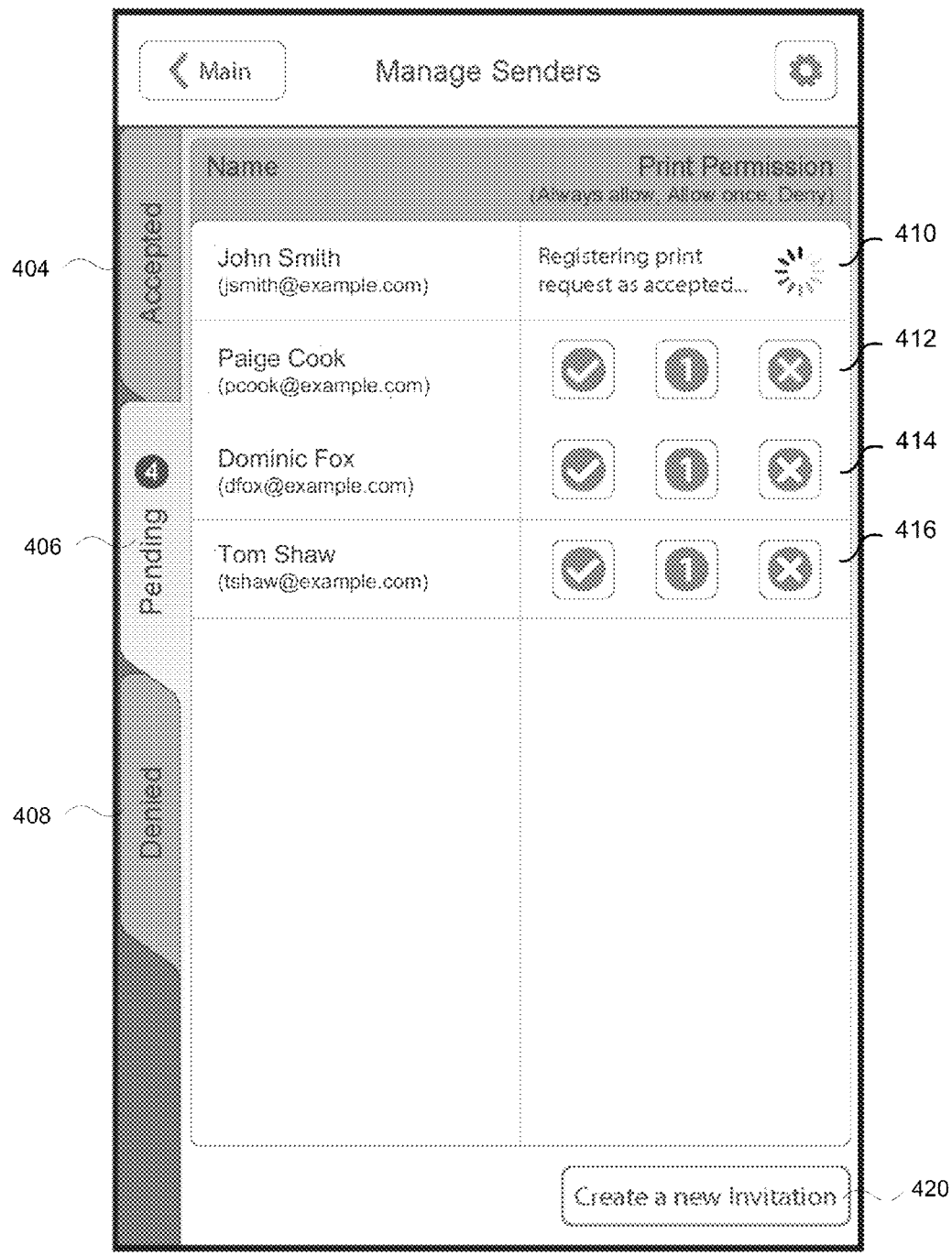
FIG. 4 shows a representation of an example of a display on mobile device for managing permissions for transferring of electronic documents by a mobile device printer driver.
Figure 5:
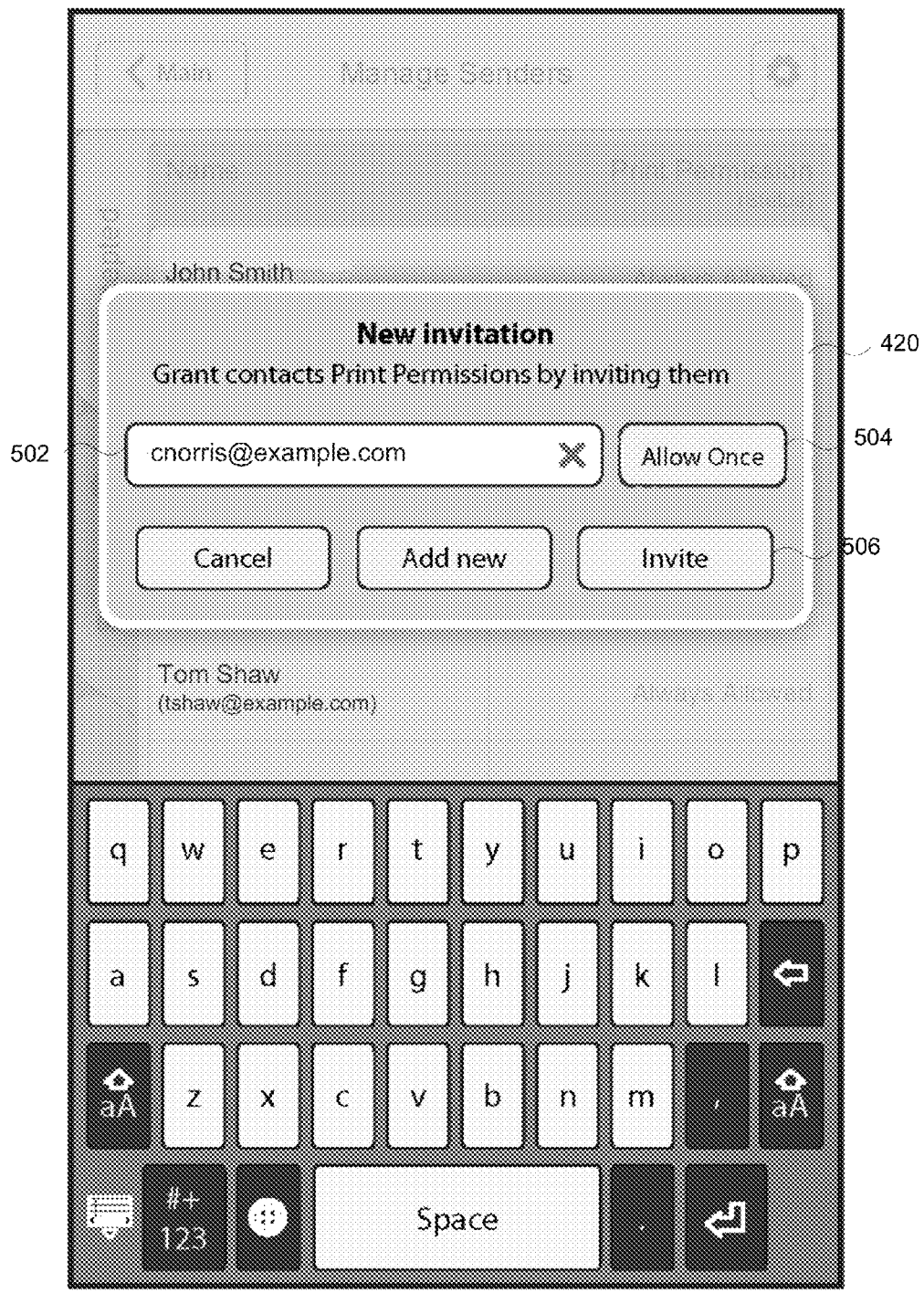
FIG. 5 shows a representation of an example of a display on mobile device for initiating an invitation to a sender device for transferring of electronic documents by a mobile device printer driver.
Figure 6:
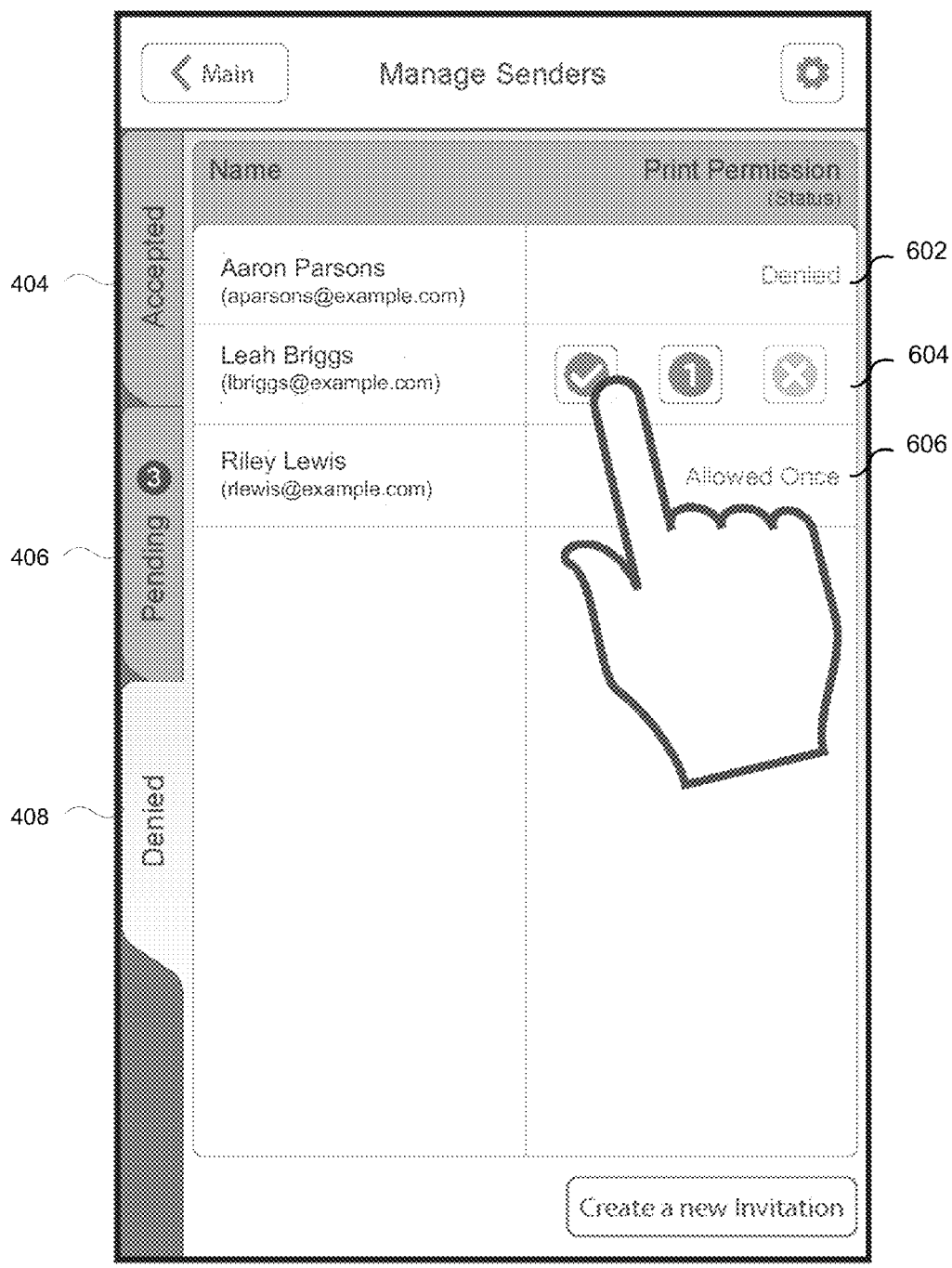
FIG. 6 shows a representation of an example of a display on mobile device for managing denied sender permissions for transferring of electronic documents by a mobile device printer driver.

FIGS. 4-6 represent a user interface on the mobile device. The user interface on the mobile device is presented to disclose features and not considered as limiting to possible implementations. FIG. 4 is a representation of a display on mobile device for managing permissions. The display identifies pending tab 406 print permission requests. The print permission requests may be identified for each user 410, 412, 414, and 416 that have initiated a print permission request. The user may interact with the display to assign a sender device printer permission such as accept the request, deny the request, accept once, or identify a transfer limit, defined by number of transfers or time period. When a print permission request is accepted for a user 410, the acceptance may be sent to the server 132 to register the request and provide confirmation to the user. In a peer-to-peer configuration, the acceptance may be sent directly to the sender device 104. Additional tabs or screens may be provided, for example, to identify previously accepted requests 404, or denied requests 408. In addition, the user of the mobile device 102/152 may be provided with the ability to initiate an invitation 420 to send to a user of a sender device 104. The acceptance of the pending permission may also include identification of transfer parameters that may be associated with all or each user. For example, the acceptance of the pending permission may include the size of the files, times that transfer would be accepted, or device parameters to be used to generate the electronic document by the mobile device printer driver.

FIG. 5 is an example representation of a display on mobile device for initiating an invitation. A new invitation pop-up, window, tab or screen 420 may be provided to enter a user identifier, such as an instant messaging ID or e-mail address 502 associated with a user which the mobile device would like to receive electronic documents from. A print permission selection may be associated with the invitation 504, which may be pre-defined or user definable to, for example, allow all, allow once, or allow a defined number of transfers when generating the invitation. Initiation of sending the invitation can then be selected 506.

FIG. 6 is a representation of a display on mobile device for managing denied sender permissions. The display 408 shows invitation previously received from user 602, 604, 606. The user of the mobile device may change the status of the request and change a permission. A subsequent acceptance, of the previously denied or expired request would then be sent to the sender device 104. Senders identified as denied may have been previously accepted as senders, but transition to denied status if, for example, they were identified as only being allowed to print once to the mobile device once and have already sent an electronic document to the mobile device.

Figure 7:
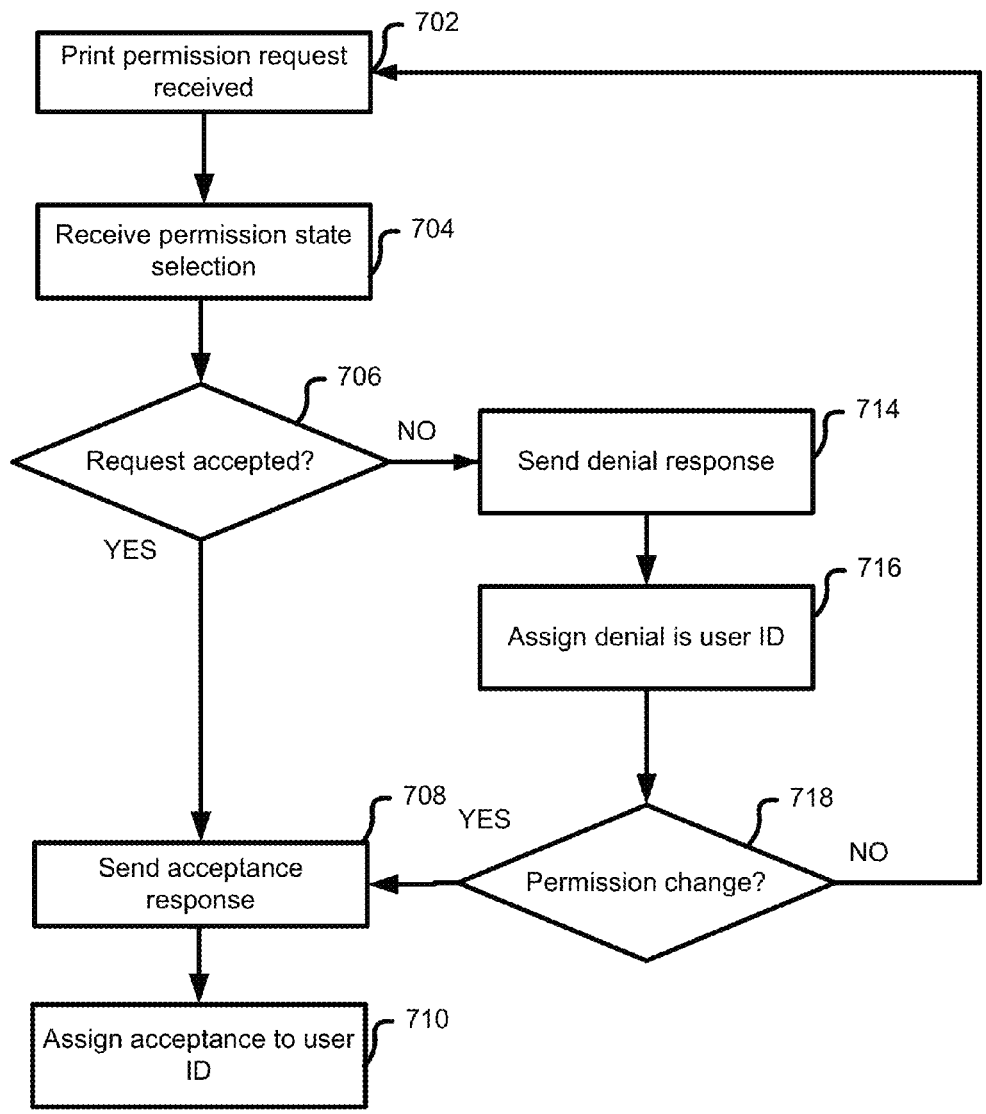
FIG. 7 shows an example of a method of managing permissions for transferring of electronic documents by a mobile device printer driver to a mobile device.

FIG. 7 is an exemplary method 700 of managing permissions for printing to a mobile device. A print permission request is received by the mobile device (702) which identifies a user indenter associated with the sending device. The request may be identified to on a pending display screen in which the user can accept, accept with restrictions, or deny the request (704) as shown, for example, in FIGS. 4, 5 and 6. In some implementations, additional parameters may be associated with the request such as, for example, destination, characteristics associated with the transfer that will be accepted, such as file size, or the mechanism by which the file transfer should occur, such as direct, drop box, or by a relay server. If the print permission request is accepted (YES at 706), an acceptance response is sent (708) either directly to the sender device or a intermediary server. The mobile device can then associate the permission to the user ID of the sender (710) and the associated permissions. If the received print permission request is not accepted (NO at 706), a denial response may be sent (714), although it may not necessarily be sent to the sender. The denial of the print permission request can then be assigned to the received user ID (716). If a subsequent change to the print permission request is performed (YES at 718) an acceptance response can be sent (708), for example allowing another print request transfer. If the permission is not changed (NO at 718), the process will continue when a subsequent print permission request is received (702).

Figure 8:
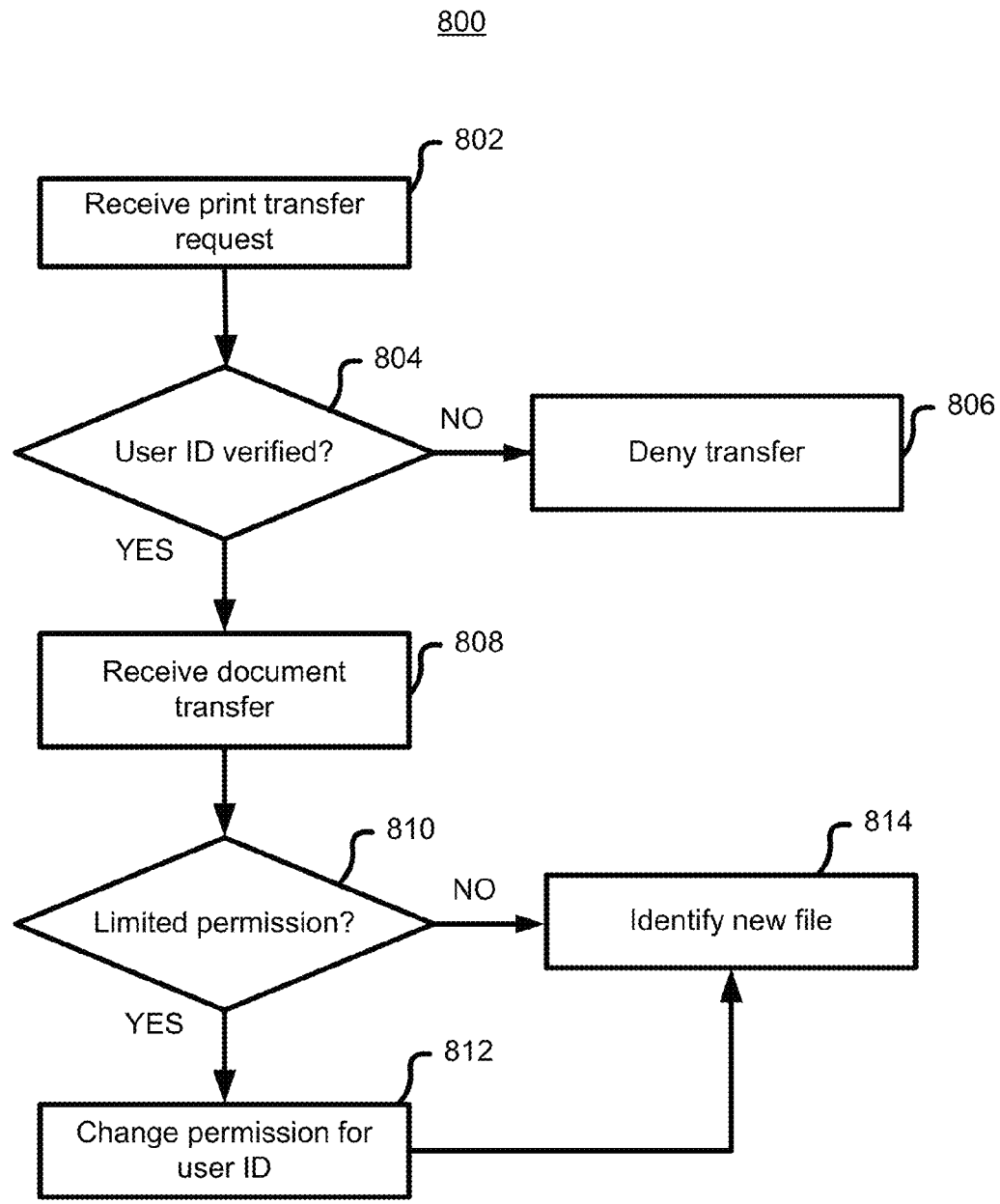
FIG. 8 shows an example of a method of receiving a print document transfer request at a mobile device for transferring of electronic documents by a mobile device printer driver.

FIG. 8 is an exemplary method 800 of receiving a print document transfer request at a mobile device. A print transfer request is received at the mobile device (802). If the user ID has been previously accepted and permission has been provided to transfer the document, and therefore verified (YES at 804) the document transfer is initiated (808) and the document is received. If a limited permission has been associated with the user ID, for example transfer once, the permission state can be changed (YES at 812), for example to denied for future transfer requests and an associated counter incremented. If limited permission is not associated with the user ID (NO at 810), the new electronic document received on the device is identified (814). If the user ID is not accepted (NO at 804), either as being denied or not previously received, the transfer is denied (806). The denial may or may not be provided to the sender device. Alternatively, verification of the user ID and permission status changes may be performed at a server prior to sending the filed to the mobile device, or may be maintained at a server to facilitate transfers when the mobile device is not accessible.

Figure 9:
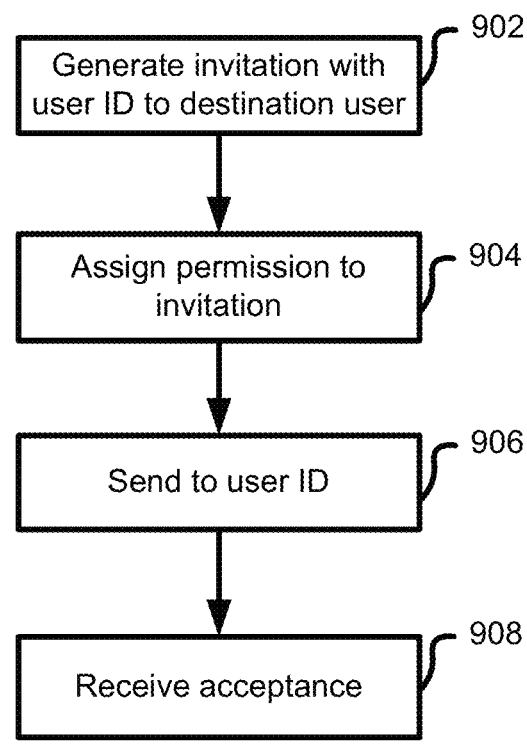
FIG. 9 shows an example of a method of initiating an invitation to a sender device.

FIG. 9 is an exemplary method 900 of initiating an invitation to a sender device. An invitation request may be initiated using an received user ID (902) through the user interface associated with the mobile device. A permission state may be assigned to the invitation (904) which may or, may not be provided in the invitation request sent to the user ID. The invitation is sent to the user ID, either directly, for example, via e-mail, instant/voice/video messaging, social networking application or via an intermediary server, which may resolve the user ID (906). The invitation can then be accepted by the sender device 104 and a confirmation received at the mobile device (908).

Figure 10:
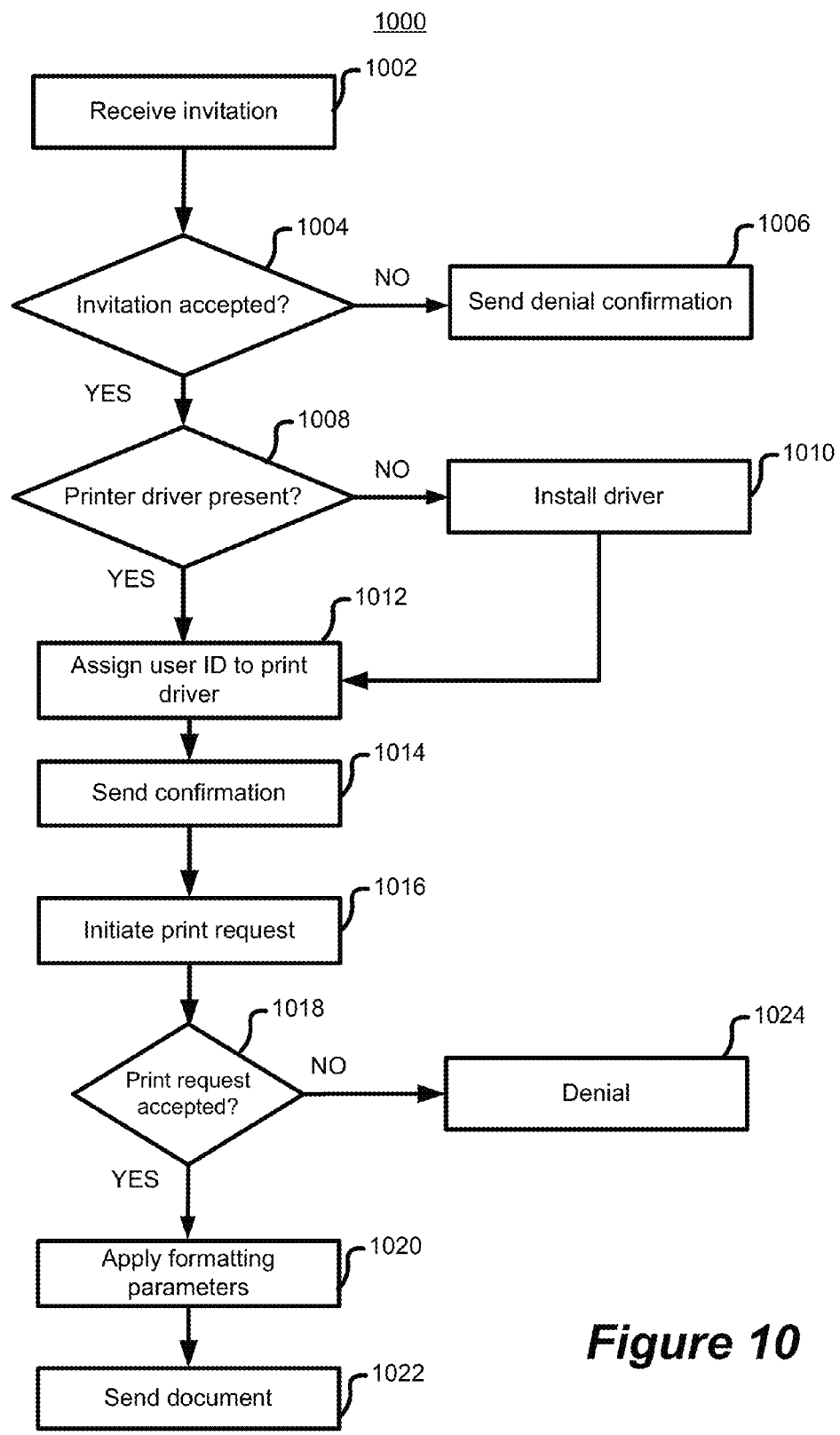
FIG. 10 shows an example of a method of processing an invitation on a sender device to allow document transfer to a mobile device using a mobile device printer driver.

FIG. 10 shows a method of processing an invitation to allow document transfer to a mobile device using a mobile device printer driver on a sending device. On the sending device an invitation is received originating from the mobile device (1002) which provides a user identifier associated with a user of the mobile device, such as an e-mail address or user ID. The invitation may be received through communication application such as e-mail application, instant/voice/video messaging application, or social networking application. The receiving application can present a prompt to the user or direct the user to a web-based interface to enable acceptance of the invitation. If the invitation is not accepted (NO at 1004) a denial confirmation can be returned to the mobile device (1006). If the confirmation is accepted by the user of the sending device (YES at 1004) it can then be determined if the appropriate printer driver is installed on the sending device. The acceptance may also include parameters for configuring the printer driver to ensure the document is formatted based upon requirements of the mobile device or user requirements for example the size of the document, resolution, content, the type of document container, such as .PDF, .PS, .DOC, content supported in documents such as images or multimedia, fonts, and security parameters such as encryption. If the printer driver is not installed (NO at 1008) either a prompt to allow installation of the printer driver or a download link can be provided to install the printer driver (1010). If the printer driver is present (YES at 1008) the user ID, or device ID, is associated with the print driver (1012). Confirmation of successful installation can be sent to the mobile device (1014). The user can try to initiate a document transfer initiation request by selecting the user ID and/or device in a print dialog box or window presented within an application to initiate a document transfer to the mobile device (1016). To initiate the document transfer a print request is sent to the server comprising a user ID of the target mobile device and an identifier of the source sending device or a user ID such as a e-mail or user name. The server may provide confirmation that the transfer should be allowed and not forward the request to the device, or may direct the request to the mobile device for confirmation of print permissions associated with the originating user. If the print request is accepted (YES at 1018) parameters that have been associated with the mobile device are applied in formatting the document (1020) and the document is transferred by the printer driver to the server or a direct transfer to the device may be initiated from the sending device to the mobile device by a network identifier provided by the mobile device (1022). If the print request is not accepted (NO at 1018), either by the server or the destination mobile device a denial or failure may be presented (1024).

Figure 11:
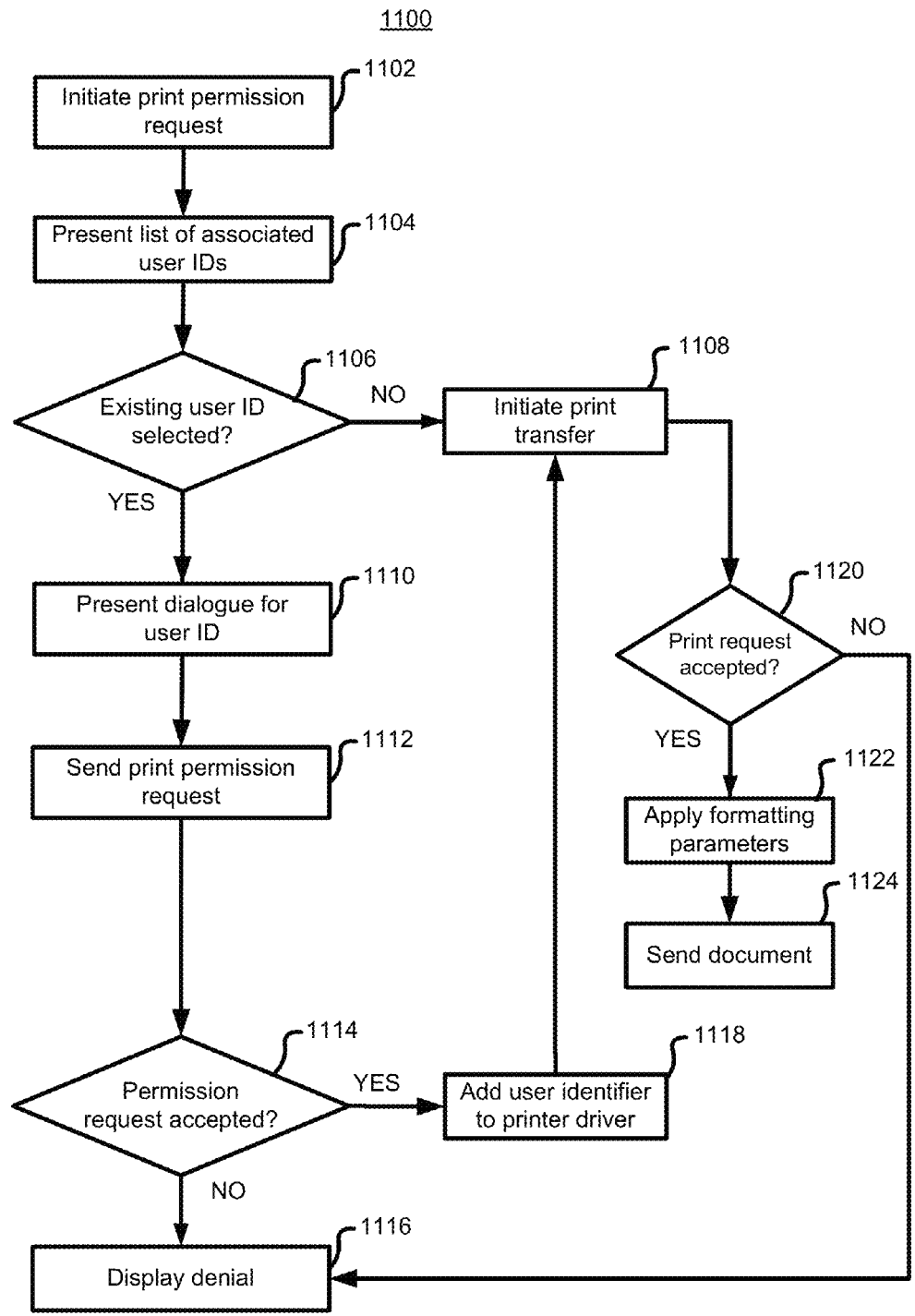
FIG. 11 shows an example of a method of document transfer to a mobile device using a mobile device printer driver on a sender device.

FIG. 11 shows a method of document transfer to a mobile device using a mobile device printer driver. When a document is selected to be printed from a sending device, such as a personal computer, a printing dialog box is presented when the print request is initiated (1102). The user may then select the destination printing device. A list of associated user IDs and/or devices are presented in a dialog box or window, either within the application or on configuration of the printer driver (1104). If an existing user ID is selected (YES at 1106) the document print transfer is initiated (1108). If a desired destination user ID or device is not presented (NO at 1106) a dialog box or window may be displayed (1110) to enable input of a user ID, such as an email address. The print transfer request can then be provided to the server for routing to one more destination mobile devices associated with the account (1112) and include a user identifier associated with the sending device or a user of the sending device. The invitation can then be accepted (YES at 1114) by the user of the mobile device and the user ID added to the print driver and the print transfer initiated (1108). If the invitation is not accepted (NO at 1114) a denial message may be displayed (1116). Additionally or alternatively, in order to associate user IDs to the printer driver the function may be provided through communication applications on the device, such as for example in an instant messaging application, the user of the personal computer may select an instant messaging contact and then select to add the user to the printer driver. Once confirmation that the user of the destination device has accepted the request has been received, the user can be added to the list of associated users in the printer driver (1118) and a document transfer initiated (1108). The acceptance may also include parameters for configuring the printer driver to ensure the document is formatted based upon requirements of the mobile device or user requirements for example the size of the document, resolution, content, the type of document container, such as .PDF, .PS, .DOC, content supported in documents such as images or multimedia, fonts, and security parameters such as encryption. To initiate the document transfer a print request is sent to the server comprising a user ID of the target mobile device and user ID of the source sending device or a user of the sending device. The server may provide confirmation that the transfer should be allowed and not forward the request to the device, or may direct the request to the mobile device for confirmation of print permissions associated with the originating user. If the print request is accepted (YES at 1120) parameters that have been associated with the mobile device are applied in formatting the document (1122) and the document is transferred by the printer driver to the server or a direct transfer to the device may be initiated from the sending device to the mobile device by a network identifier provided by the mobile device (1124). If the print request is not accepted (NO at 1120), either by the server or the destination mobile device a denial or failure may be presented (1116).

Figure 12:
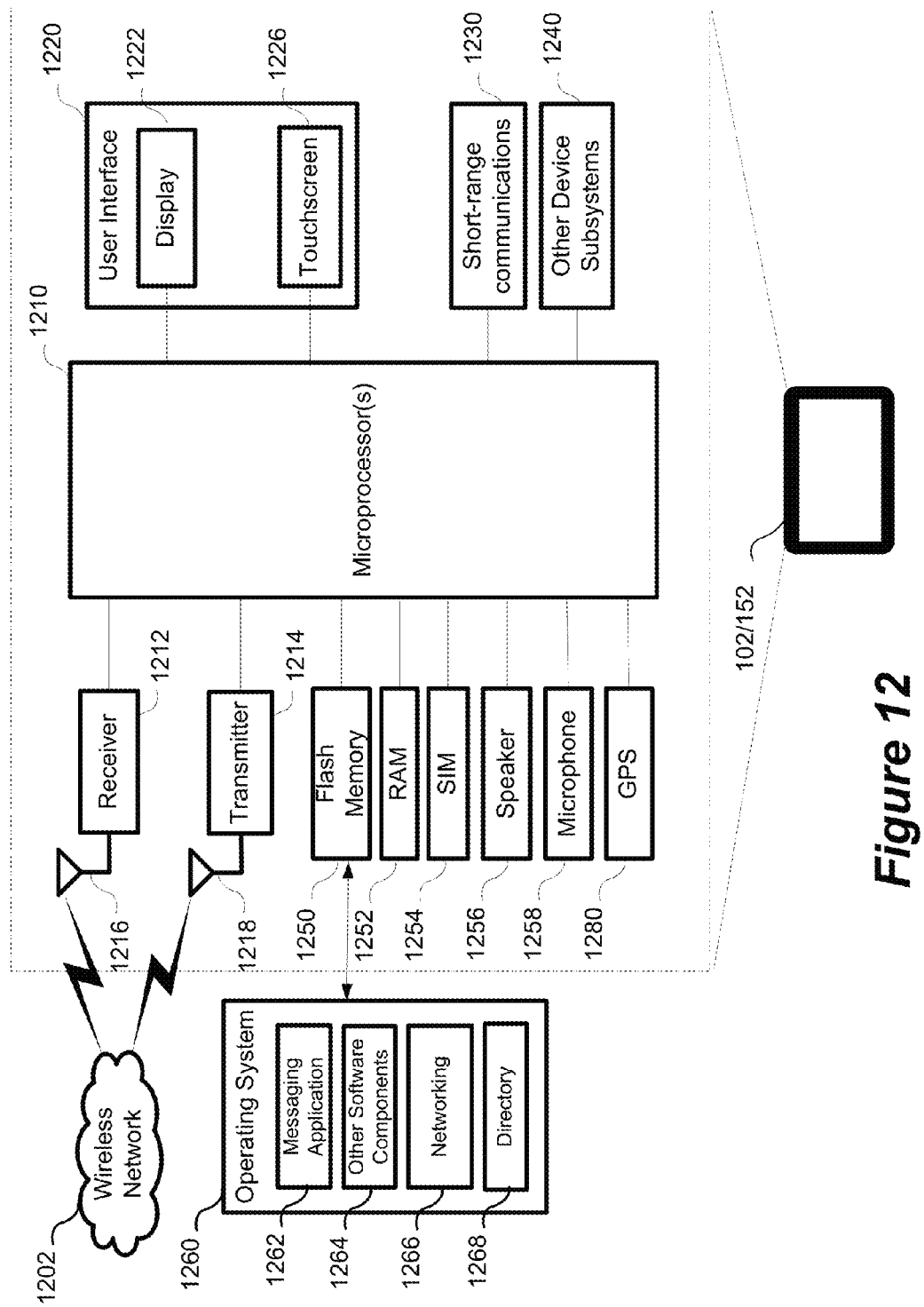
FIG. 12 shows an example of a block diagram representation of a mobile device.

FIG. 12 is a block diagram depiction of an example mobile device for receiving 'printed' documents. As shown by way of example in FIG. 12, the mobile device 102/152, includes a processor (or microprocessor) 1210 for executing one or more applications, memory in the form of flash memory 1250 and RAM 1252 (or any equivalent memory devices) for storing the one or more applications, related data and received electronic documents 101, and a user interface 1220 with which the user interacts with the device. The user interface 1220 may include a display 1222 and a touch-sensitive display 1226.

As shown by way of example in FIG. 12, the mobile device 102/152 may include a radiofrequency (RF) transceiver comprising a receiver 1212 and associated receiver antenna 1216 and transmitter 1214 and associated transmitter antenna 1218. The mobile device 102/152 may be in a portable form factor such as a smartphone, tablet, net book, laptop, portable computing device or an integrated mobile computer device that may access different networks wirelessly. The RF transceiver for communication with a wireless network 1202 using a wireless communication protocols such as, for example but not limited to, GSM, UMTS, LTE, HSPDA, CDMA, W-CDMA, Wi-MAX, Wi-Fi etc. A subscriber identify module (SIM) card 1254 may be provided depending on the access technology supported by the device. Optionally, where the device is a voice-enabled communications device such as, for example, a tablet, Smartphone or cell phone, the device would further include a microphone 1258 and a speaker 1256. Short-range communications 1230 is provided through wireless technologies such as Bluetooth™ or wired Universal Serial Bus™ connections to other peripheries or computing devices or by other device sub-systems 1240 which may enable access tethering using communications functions of another mobile device. In a tethering configuration the mobile device may provide the network information associated with the tethered or master device to be used to access the network. This device may optionally include a Global Positioning System (GPS) receiver chipset 1280 or other location-determining subsystem.

The mobile device 102/152 also includes an operating system 1260 and software components 1262 to 1268 which are described in more detail below. The operating system 1260 and the software components 1262 to 1268 that are executed by the microprocessor 1210 are typically stored in a persistent store such as the flash memory 1250, which may alternatively be a read-only memory (ROM) or similar storage element (not shown). Those skilled in the art will appreciate that portions of the operating system 1260 and the software components 1262 to 1268, such as specific device applications, or parts thereof, may be temporarily loaded into a volatile store such as the RAM 1252. Other software components can also be included, as is well known to those skilled in the art.

The subset of software applications that control basic device operations, including data and voice communication applications, may be installed on the mobile device 102/152 during its manufacture. Other software applications include a message application 1262 that can be any suitable software program that allows a user of the mobile device 102/152 to send and receive electronic messages. The software applications can further comprise a networking component 1266, directory component 1268, and other suitable modules (not shown). The networking component 1266 can determine which interfaces the mobile device can access for IP connectivity. The directory component 1268 can identify directories for storing electronic documents 101 on the device in RAM, or network storage based dropbox locations where electronic documents 101 can be retrieved.

Some examples of other software components 1264 that may be executed by the operating system 1260 may include, peer-to-peer or instant/voice/video messaging application, social networking, mapping, internet browser, calendar, address book and phone applications It will be appreciated that the various applications may operate independently or may utilize features of other applications. For example, the phone application and messaging application may use the address book for contact details.

Although certain methods, apparatus, computer readable memory, and articles of manufacture have been described herein, the scope of coverage of this disclosure is not limited thereto. To the contrary, this patent covers all methods, apparatus, computer readable memory, and articles of manufacture fairly falling within the scope of the appended claims either literally or under the doctrine of equivalents.

Although the following discloses example methods, system and apparatus including, among other components, software executed on hardware, it should be noted that such methods, system and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods, system and apparatus.

The invention claimed is:

1. A method of document delivery to a mobile device using mobile device based permissions the method comprising:
   sending a print permission request from a sending device to a server coupled to a communications network providing a user identifier associated with the mobile device and a user identifier associated with the sending device;
   receiving confirmation of acceptance of the print permission request at the sending device from the server; and
   adding the user identifier associated with the mobile device to a printer driver on the sending device, the user identifier associated with the mobile device presented in a print dialog box on the sending device when an electronic document is to be formatted and transferred by the printer driver from the sending device to the mobile device.

2. The method of claim 1 wherein adding the user further comprises adding a device identifier.

3. The method of claim 1 wherein the confirmation further comprises configuration parameters for configuring the printer driver to format the document to be sent to the mobile device.

4. The method of claim 3 wherein the confirmation of acceptance further comprises a permission identifier to identify a number of times a document transfer will be accepted by the mobile device.

5. The method of claim 4 further comprising formatting a document using received configuration parameters and transferring from the sending device a document from the printer driver to the mobile device, the transfer initiated from the printer driver from within a document creation application.

6. The method of claim 1 wherein the confirmation provides a destination address associated with the mobile device.

7. The method of claim 6 wherein the destination address includes a folder identifier.

8. The method of claim 7 wherein the destination address includes an indicator for identifying a size of document that will be accepted by the mobile device.

9. The method of claim 6 wherein the destination address is a universal resource locator (URL) wherein the formatted electronic document is transferred by a hyper text transfer protocol (HTTP) post or a secure hyper text transfer protocol (HTTP) post using the received URL to transfer the formatted electronic document directly from the sending device to the mobile device.

10. The method of claim 1 further comprising displaying the print permission request on a display of the mobile device prior to providing confirmation of acceptance of the printer permission request.

11. The method of claim 1 wherein the server identifies a mobile device identifier associated with the user identifier in the print permission request.

12. The method of claim 1 wherein prior to sending the print permission request a dialog box is presented on the sending device requesting identification of a particular user identifier generated by the printer driver.

13. The method of claim 1 wherein prior to subsequently sending a document via the printer driver from the sending device a dialog box is presented on the sending device requesting identification of the user identifier that has already been associated with the printer driver.

14. A system comprising:
   a mobile device for receiving electronic documents, the mobile device operable to associate a permission with a user identifier associated with the sending device;
   a server for locating the mobile device on a network;
   a sending device for sending documents to the mobile device, the documents transferred by a printer driver from within a document application on the sending device, the printer driver providing formatting of the document to be received by the mobile device, the client device operable for sending a print permission request to the server providing a user identifier associated with the mobile device and a user identifier associated with the sending device; and
   the server locating the mobile device associated with the user identifier of the mobile device and providing the print permission request to the mobile device, the mobile device associating a permission with the user identifier associated with the sending device and providing confirmation to the sending device of acceptance of the print permission request, the sending device adding a user identifier to the printer driver for subsequent sending of documents to the mobile device.

15. The system of claim 14 wherein the confirmation further comprises configuration parameters for configuring the printer driver to format the document to be sent to the mobile device.

16. The system of claim 14 wherein the confirmation of acceptance further comprises a permission identifier to identify a number of times a document transfer will be accepted by the mobile device.

17. The system of claim 14 wherein the confirmation provides a destination address associated with the mobile device.

18. The system of claim 17 wherein the destination address includes a folder identifier.

19. The system of claim 17 wherein the destination address includes an indicator for identifying a size of document that will be accepted by the mobile device.

20. The system of claim 17 wherein the destination address is a universal resource locator (URL) wherein the formatted electronic document is transferred by a hyper text transfer protocol (HTTP) post or a secure hyper text transfer protocol (HTTP) post using the received URL to transfer the formatted electronic document directly from the sending device to the mobile device.

21. The system of claim 14 wherein the print permission request is displayed on a display of the mobile device prior to providing confirmation of acceptance of the printer permission request.

22. The system of claim 14 wherein the server identifies a mobile device identifier associated with a user ID in the print permission request.

23. The system of claim 14 wherein prior to the mobile device send a document via the printer driver a dialog box is presented on the sending device requesting identification of a particular user identifier that has already been associated with the printer driver.

24. A non-transitory computer readable memory containing instructions for document delivery to a mobile device using mobile device based permissions, the instruction which when executed by a processor of a sending device performing:

sending a print permission request from a sending device to a server coupled to a communications network providing a user identifier associated with the mobile device and a user identifier associated with the sending device;

receiving confirmation of acceptance of the print permission request at the sending device from the server; and adding the user identifier associated with the mobile device to a printer driver on the sending device, the user identifier associated with the mobile device presented in a print dialog box on the sending device when an electronic document is to be formatted and transferred by the printer driver from the sending device to the mobile device.

\* \* \* \* \*